US007978344B2

(12) United States Patent
Tamayo De Miguel et al.

(10) Patent No.: US 7,978,344 B2
(45) Date of Patent: Jul. 12, 2011

(54) SYSTEM AND METHOD FOR THE INSPECTION OF MICRO AND NANOMECHANICAL STRUCTURES

(75) Inventors: Francisco Javier Tamayo De Miguel, Madrid (ES); Johan Mertens, Le Teich (FR); Montserrat Calleja Gómez, Madrid (ES)

(73) Assignee: Consejo Superior de Investigaciones Cientificas, Madrid (ES)

( * ) Notice: Subject to any disclaimer, the term of this patent is extended or adjusted under 35 U.S.C. 154(b) by 509 days.

(21) Appl. No.: 11/988,737

(22) PCT Filed: Jul. 13, 2006

(86) PCT No.: PCT/ES2006/000405
§ 371 (c)(1),
(2), (4) Date: Dec. 18, 2008

(87) PCT Pub. No.: WO2007/006834
PCT Pub. Date: Jan. 18, 2007

(65) Prior Publication Data
US 2009/0207404 A1   Aug. 20, 2009

(30) Foreign Application Priority Data

Jul. 14, 2005  (EP) .................................. 05380157

(51) Int. Cl.
*G01B 11/14* (2006.01)
(52) U.S. Cl. ......... 356/614; 356/615; 356/616; 356/620
(58) Field of Classification Search .... 356/237.1–241.6, 356/242.1–243.8, 426–431, 600–640
See application file for complete search history.

(56) References Cited

U.S. PATENT DOCUMENTS

| 3,840,301 | A | * | 10/1974 | Pryor et al. | 356/505 |
| 5,274,230 | A | * | 12/1993 | Kajimura et al. | 250/234 |
| 6,708,556 | B1 | * | 3/2004 | Kim et al. | 73/105 |
| 2006/0075803 | A1 | * | 4/2006 | Boisen et al. | 73/31.06 |

FOREIGN PATENT DOCUMENTS

| EP | 1575058 | 9/2005 |
| WO | 0075627 | 12/2000 |
| WO | 2004/046689 | 6/2004 |

OTHER PUBLICATIONS

International Search Report issued Jan. 31, 2007 in International (PCT) Application No. PCT/ES 2006/000405.

(Continued)

*Primary Examiner* — Gregory J Toatley
*Assistant Examiner* — Jarreas C Underwood
(74) *Attorney, Agent, or Firm* — Wenderoth, Lind & Ponack, LLP.

(57) ABSTRACT

The system for surface inspection is arranged to detect relative displacement and/or vibration features of a plurality of points of a plurality of elements (51) forming part of a mechanical structure (5), such as a micro- or nanomechanical structure. A light beam is displaced along the mechanical structure along a first trajectory (A), so as to detect a plurality of subsequent reference positions (C) along said first trajectory (A), and the light beam is further displaced along the mechanical structure along a plurality of second trajectories (B), each of said second trajectories (B) being associated with one of said reference positions (C).
The invention further relates to a corresponding method and to a program for carrying out the method.

34 Claims, 10 Drawing Sheets

OTHER PUBLICATIONS

European Search Report issued Nov. 10, 2005 in corresponding European Application No. EP 05 38 0157.

Álvarez, Mar, et al., "*Optical Sequential Readout of Microcantilever Arrays for Biological Detection*", Sensors and Actuators B 106, Elsevier Sequia, (2005), pp. 687-690.

Lang, H.P., et al., "*Sequential Position Readout from Arrays of Micromechanical Cantilever Sensors*", Applied Physics Letters, Melville, NY, US, vol. 72, No. 3, Jan. 19, 1998, pp. 383-385.

Craighead, H.G., et al. "*Nanoeletromechanical Systems*", Science, vol. 290, Nov. 2000, pp. 1532-1535.

Martin, Y., et al., "*Atomic Force Microscope-Force Mapping and Profiling on a sub 100-AA scale*", Journal of Applied Physics, vol. 61, May 1987, pp. 4723-4729.

Ilic, B., et al., "*Mechanical resonant immunospecific biological detector*", Applied Physics Letters, vol. 77, Jul. 2000, pp. 450-452.

Stephan, A.C., et al., "*Microcantilever charged-particle flux detector*", Review of Scientific Instruments, 73, Jan. 2002, pp. 36-41.

Vettiger, P., et al., "*Ultrahigh density, high-data-rate NEMS-based AFM data storage system*", Microelectronic Engineering, vol. 46, 1999, pp. 11-17.

Engel, A., et al., "*Atomic force microscopy: a powerful tool to observe biomolecules at work*", Trends in Cell Biology, vol. 9, Feb. 1999, pp. 77-80.

Vettiger P., et al., "*The millipede-more than one thousand tips for future AFM storage*", IBM J. Res Develop., vol. 44, No. 3, May 2000, pp. 323-339.

Meyer, G. et al., "*Simultaneous measurement of lateral and normal forces with an optical-beam-deflection atomic force microscope*", Applied Physics Letters, vol. 57, Nov. 1990, pp. 2089-2091.

Jeon, S., et al. "*Instant curvature measurement for microcantilever sensors*", Applied Physics Letters, vol. 85, No. 6, Aug. 9, 2004, pp. 1083-1084.

\* cited by examiner

SYSTEM AND METHOD FOR THE INSPECTION OF MICRO AND NANOMECHANICAL STRUCTURES

FIELD OF THE INVENTION

The invention is related to the field of devices based on micro- or nano-mechanical structures, such as micro- or nano-cantilevers, micro- or nano-bridges, micro- or nano-membranes etc.

STATE OF THE ART

There is an increasing interest in systems and methods based on micromechanical and nanomechanical elements (H. G. Craighead, "*Nanoelectromechanical systems*", *Science* 290, page 1532-1535 (2000)). Microelectromechanical systems (MEMS) and microcantilever-based devices are two relevant examples of this kind of systems. To name a few applications, MEMS accelerometers are used for seismic exploration and monitoring, automobile airbag sensing, and inertial navigation. Similar technologies are used for blood pressure monitoring. MEMS micro-mirrors have been developed as photonic switches for the optical telecom industry; micro-mirrors can also be used for portable displays and laser beam positioning applications. MEMS can be also used as transducers in biological and chemical sensors. There are also a wide range of applications based on microcantilevers, which can be considered as one of the simplest forms of MEMS. For example, microcantilevers are used for sensitive mapping of attractive and repulsive forces at nanometer scale in atomic force microscopy (Y. Martin, C. C. Williams and H. K. Wickramasinghe, "*Atomic Force Microscope-Force Mapping and Profiling on a sub 100-Å scale*", *Journal of Applied Physics* 61, pp. 4723-4729 (1987)), for ultrasensitive nano-mechanical biological and chemical sensors (B. Ilic, D. Czaplewski, H. G. Craighead, P. Neuzil, C. Campagnolo and C. Batt, "*Mechanical resonant immunospecific biological detector*", *Applied Physics Letters* 77, pp. 450-452 (2000)), for charged-particle detection (A. C. Stephan, T. Gaulden, A.-D. Brown, M. Smith, L. F. Miller and T. Thundat, "*Microcantilever charged-particle flux detector*" *Review of Scientific Instruments* 73, pp. 36-41 (2002)), for writing and readout of ultrahigh density data storage (P. Vettiger et al, "*Ultrahigh density, high-data-rate NEMS-based AFM data storage system*", *Microelectronics Engineering* 46, pp. 11-17 (1999)).

Characterization of the shape, profile, motion, stress and strain of MEMS and microcantilevers plays an important role in the product development and evolution. In addition, real time measurement of the shape, profile, motion, stress and/or strain is very valuable for monitoring the mechanical response of, for example, chemical and biological sensors that are based on the shape, profile, motion, stress or strain of a MEMS or micro- or nano-cantilevers.

MEMS and microcantilever systems include systems based on cantilevers having a fixed end and a movable end; in these systems, it is normally the displacement and/or movement of the "free" end that is detected. However, there are also systems based on cantilevers clamped at both ends; then, the movement of the central part can be detected.

Further, there are other micro- and nanomechanical structures that are movable and flexible, such as doubly clamped paddles whose "easy" direction of motion corresponds to the torsion of the paddle around the axis of the hinges that connect the paddle to a frame (basically, like a square racket fastened to a frame by two opposite handles of the racket, extending along an axis). Other known systems use membranes that are connected to a frame through two sets of hinges, which allows two angular degrees of freedom.

In chemical/biological sensors based on MEMS and microcantilevers, the surface of the micro- or nanomechanical element is sensitised with receptors that selectively recognize the targeted substance. The attachment of the targeted substance on the surface of the micro- or nanomechanical element produces a change of the shape, profile, strain, stress and motion (vibration) of the mechanical element. This change is usually measured by measuring the displacement of a representative part of the mechanical element (this usually is the free end of a singly clamped microcantilever, but it can also be the center of a doubly clamped microcantilever, a part of a membrane sheet, etc.). This displacement can be of about 1-100 nanometers and in many cases it is necessary to obtain a resolution better than 1 nm, depending on the application. For the readout of the displacement, there are several techniques such as capacitive detection, detection based on tunnel current, optical interferometry, piezoresistive readout and the optical beam deflection technique.

Examples of MEMS and microcantilever systems are disclosed in, for example:

Engel et al, *Trends in Cell Biology*, Volume 9, February 1999, pp. 77-80, "*Atomic force microscopy: a powerful tool to observe biomolecules at work*"

P. Vettiger et al, *IBM J. Res. Develop.*, Volume 44, Number 3, May 2000, pp. 323-339. "*The millipede-more than one thousand tips for future AFM storage*"

WO-A-01/33226

WO-A-03/091458

The optical beam deflection method is the most sensitive one, and it has the advantage that it can be easily implemented. FIG. 1 schematically illustrates a conventional prior art arrangement for optical beam deflection. A light source 101 (normally a laser source) produces a light beam 102 (normally a laser light beam, in the visible, ultraviolet or infrared spectrum) that is focused (that is, either directly focused or via directing means involving, for example, one or more mirrors 103, etc.) onto the part of the mechanical element where the displacement is to be measured, for example, onto the end of a microcantilever 104. The deflection of the beam reflected off the cantilever is measured with a position sensitive detector 105 (such as a photodetector, for example, a segmented photodetector, a continuous position sensing photodetector, a photodetector array, a CCD, etc.). For example, a segmented photodetector can be employed that is split into two segments oriented parallel to the cantilever motion axis. The cantilever deflection produces a displacement of the reflected laser spot on the photodetector. Thus, the difference in photocurrents between the two segments is proportional to the cantilever deflection. Similarly, the optical beam deflection technique can be applied to other types of mechanical elements such as doubly clamped cantilevers, membrane sheets, micropaddles, etc. Similarly, it can be applied for readout of other types of displacements instead of the out-of-plane displacement, such as the torsional motion of microcantilevers and micropaddles, etc. (G. Meyer and N. M. Amer, "*Simultaneous measurement of lateral and normal forces with an optical-beam-deflection atomic force microscope*", *Applied Physics Letters*, vol. 57, pp. 2089-2091).

This system is suitable for measuring both the static and the dynamic behaviour of mechanical elements such as cantilevers, for example, the maximum deflection, mean value of deflection, amplitude at a reference frequency (the element can be externally driven by an excitation force oscillating at the reference frequency), phase of the motion with respect to a external driving signal, frequency, etc. The measured static displacement, amplitude, frequency, etc., can then be related to an object that is to be measured and that interacts with the cantilever, and with signals and/or procedures used to stimulate the object and/or the cantilever.

Now, the technique described above is practical when the displacement/movement of a single part of a single mechanical element is to be measured. However, this technique cannot be applied to devices based on arrays comprising a plurality of mechanical elements, in which the diplacement/movement of each element needs to be measured. These devices provides for multifunctionality and for higher speed and/or more complete information than devices based on a single mechanical element. For instance, chemical and biological sensors based on microcantilever arrays can detect several substances by sensitising each cantilever with a different receptor. In addition, it may be advantageous to obtain information about the displacement of several regions of the mechanical element, so as to obtain more information about the external stimulus that is measured or about different stimuli that interact with different parts of the mechanical element.

Although the optical beam deflection technique as outlined above can resolve deflections as small as 0.1 nm, implementation of this technique for readout in microcantilever arrays has proved to be a complex issue. So far, arrays of light sources have been used, said sources having the same pitch as the cantilever array. The light sources are switched on and off individually, for individual illumination of each cantilever of the array, and for sequential readout of the deflection of each cantilever by a continuous position sensing photodetector (one type of position sensitive detector). This kind of systems is disclosed in, for example, H. P. Lang, et al., *Applied Physics Letters*, Volume 72, Number 3, 19 Jan. 1998, pp. 383-385, "*Sequential Position Readout from Arrays of Micromechanical Cantilever Sensors*".

However, this technique requires the use of sophisticated technology and precise alignment of the light beams, the microcantilevers and the photodetector(s). Moreover, one light beam array will only be suitable for microcantilever arrays having the same pitch (distance between subsequent cantilevers) and the same number of elements.

Mar Alvarez and Javier Tamayo, "*Optical sequential readout of microcantilever arrays for biological detection*", *Sensors and Actuators B* 106 (2005), pp. 687-690, available online at www.sciencedirect.com, discloses a system such as the one illustrated in FIG. 2, wherein the microcantilevers of an array 204 are illuminated by a single laser light source 201 placed on a one-dimensional voice-coil actuator whereby the incident laser beam is made to periodically scan the array in a direction perpendicular to the longitudinal axes of the cantilevers. Thus, the free end of each cantilever of the microarray is sequentially illuminated. When the laser beam reflects off the surface of a microcantilever of the array, an increase of the total photocurrent of a position sensitive detector 205 that is arranged with an adequate geometry to collect the laser beam reflected off the cantilever, is detected (this increase corresponds to the peaks of the detected photocurrent 206). When the increase of photocurrent is detected, the position coordinates of the corresponding spot where the reflected laser beam hits the photodetector are determined on the basis of the photocurrent signals generated by the detector, and these coordinates can then be used to determine the deflection of the cantilever.

On the other hand, sometimes there can be a need to measure not only the displacement of a specific part of the cantilever or other type of mechanical element, but rather the general change in curvature or general shape of the cantilever or similar, or of a part thereof. Thus, a technique is known which has been applied to microcantilever sensors that utilize the bending of a cantilever having a bilayer structure (e.g., a thin gold film on silicon or silicon nitride). The curvatures of the cantilevers undergo a change in response to any change of temperature or differential surface stress due to molecular adsorption. To obtain the change of curvature radius, a measurement system is known based on the use of eight light emitting diodes focused on various positions of a gold-coated silicon cantilever. The deflection at each point on the cantilever is measured with subnanometer precision by a position sensitive detector using the optical beam deflection technique, and thus the curvature of the cantilever is obtained. This method is disclosed in Sangmin Jeon, et al., "*Instant curvature measurement for microcantilever sensors*", *Applied Physics Letters*, vol. 85, no. 6, pp. 1083-1084 (9 Aug. 2004).

In addition to cantilever systems in which the displacement of a specific part of the cantilever is to be measured, or in which the curvature of the cantilever is to be measured, there may be mechanical structures such as membrane sheets sensitised in different regions to different stimulus, in such a way that to obtain the information over each stimulus is necessary to measure the displacement of each sensitised region of the mechanical structure.

On the other hand, the mapping of the static and dynamic displacement of MEMS and microcantilever systems plays an important role in the characterization of these systems for the development of reliable, reproducible and marketable devices. Among the techniques for imaging the motion of micromechanical structures are: Stroboscopic Microscopic Interferometer system and Laser-Doppler vibrometer. These techniques can be bulky and expensive, and some use complex algorithms for obtaining an image of the displacement and vibration. Moreover, it is not always possible to simultaneously measure the static and dynamic displacements using these techniques. For instance, the Laser-Doppler vibrometer measures the out-of-plane velocity of a point of the mechanical structure.

DESCRIPTION OF THE INVENTION

There are systems based on micro- or nanomechanical elements in which the displacement or vibration of the micro- or nanomechanical elements is measured in relation to an external object that interacts with the elements. For instance, chemical and biological sensors based on micro- and nanomechanical elements are based on the fact that the adsorption of a substance on the surface of a mechanical element changes the shape, profile, strain, stress and vibration characteristics of the mechanical element. This change is measured by measuring the displacement of the mechanical element at a specific and representative point, for instance, a point near the free end of a singly clamped cantilever. This can be accurately measured by using the optical beam deflection technique, directing a laser beam to a point close to the end of a cantilever. From the displacement of that point, it is possible to deduce, using theoretical models, the displacement of the whole mechanical element. However, these models assume ideal conditions and are not always applicable to the real situations. It would be advantageous to be able to obtain real-time measurement of the displacement and motion of a plurality of selected locations of a mechanical structure or of a region of interest of that structure. This would provide a higher amount of information on how the mechanical structure changes in relation to the object to be measured, which would in turn imply higher sensitivity and higher signal-tonoise ratio. For instance, in some microcantilever sensors, the curvature along the microcantilever is related to molecules adsorbed on the microcantilever. To obtain the curvature, it is necessary to measure the displacement of several locations along the microcantilever. In other sensors based on more complex mechanical microstructures, the measurements of the profile along several axes would provide more information about how the mechanical microstructure changes in response to the object to be measured. In addition, there may be mechanical structures such as membrane sheets sensitised in different regions to different stimulus, in such a way that for obtaining the information over each stimulus it is necessary to measure the displacement of each sensitised region of the mechanical structure. In addition, it can be necessary to measure the displacement of individual elements belonging to two-dimensional arrays in applications that require multi-functionality, high speed, and large amounts of information. Thus, the applicant has considered that there is a need for a system and method that provides for the detection of the displacement and vibration of a plurality of selected points of micro- or nanomechanical elements along at least one direction or axis, and which uses one single light source for detecting the map or profile of the static displacement and vibration features (amplitude, phase, frequency etc) of a plurality of elements forming part of a micro- or nano-mechanical structure, such as a one-dimensional or two-dimensional array.

A first aspect of the invention relates to a system for surface inspection arranged to detect relative displacement (corresponding to, for example, the slope of a part or region of an element) and/or vibration characteristics of a plurality of points of a plurality of elements (such as cantilevers) forming part of a mechanical structure (such as a micro- or nanomechanical structure, such as a micro-cantilever array). The system comprises:

a light source (such as a laser source, for example, a laser diode) arranged to generate at least one light beam (for example, a laser beam);

a position sensitive detector (for example, a photodetector or similar arranged to produce an output signal or a set of output signals which, on the one hand, depends on the position of an incident light beam on said photodetector and, on the other hand, on the intensity of the light of the incident light beam) arranged to receive the light beam when reflected off the mechanical structure and to produce at least one output signal in response to receipt of said light beam;

an electronic control system (which can be implemented in a personal computer or, for example; in another type of programmable electronic device, such as a microcontroller or similar device);

scan means (that is, some kind of scan mechanism) for relative displacement of said light beam with respect to the mechanical structure, so as to scan said mechanical structure with the light beam, following instructions from the electronic control system (the scan means can include means for displacing the light beam generator or a part thereof, and/or one or more mirrors or other light reflecting devices, as well as corresponding drive means for displacing the relevant components).

In accordance with the invention, the electronic control system is arranged to control the scan means so as to displace the light beam along the mechanical structure along a first trajectory, so as to detect a plurality of subsequent reference positions along said first trajectory. The electronic control system is operatively associated with the position sensitive detector so as to determine said reference positions as a result of an analysis of at least one output signal from said position sensitive detector (for example, as a result of the position-dependence of said output signal, that is, as a result of analysing how the output signal changes during displacement of the light beam along the structure).

The electronic control system is further arranged to control the scan means so as to displace the light beam along the mechanical structure along a plurality of second trajectories, each of said second trajectories being associated with one of said reference positions (so that, for example, each second trajectory begins at such a reference position, or has a predetermined relation to such a reference position).

The electronic control system is further arranged to obtain, during displacement of the light beam along each of said second trajectories, a plurality of position signal outputs from said position sensitive detector. These position signal outputs can be used to determine relative displacement and/or vibration characteristics of the corresponding points of the inspected structure.

Thus, the invention makes it possible to obtain information regarding a large number of points of different elements making up a structure, by scanning said elements in accordance with the respective second trajectories. Thus, more complete information can be obtained.

The electronic control system can be operatively associated with said position sensitive detector so as to determine said reference positions as a result of an analysis of the amplitude (for example, of the position-dependence of said amplitude) of said at least one output signal from said position sensitive detector.

For example, the electronic control system can be operatively associated with said position sensitive detector so as to determine that a position is a reference position:

when said position corresponds to a local maximum in the amplitude of said at least one output signal from said position sensitive detector (which can be due to a total reflection of the beam against the corresponding element);

when said position corresponds to a local minimum in the amplitude of said at least one output signal from said position sensitive detector (such a local minimum can be due to, for example, a gap between two cantilevers of a cantilever array);

when said position corresponds to a local maximum of slope in the amplitude of said at least one output signal from said position sensitive detector (this can be due to the edge of a cantilever of an array, where there is a sudden change in the reflected light intensity); or when said position corresponds to a position having a specified relation to positions corresponding to local maxima and/or minima in the amplitude of said at least one output signal from said position sensitive detector (for example, the reference position can be chosen to correspond to a position equidistant to two positions corresponding to local minima in the reflected light intensity, that is, to a position between the two gaps on the sides of a cantilever in a cantilever array).

The amplitude of said at least one output signal from said position sensitive detector can be indicative of the intensity of the light beam received by the position sensitive detector.

The electronic control system can be arranged to:

displace the light beam along said first trajectory;

upon detection of a reference position, interrupt displacement of the light beam along said first trajectory and instead displace the light beam along a second trajectory corresponding to said reference position;

subsequently, continue displacement of the light beam along said first trajectory until detecting a subsequent reference position.

Alternatively, the electronic control system can be arranged to:

displace the light beam along said first trajectory until reaching an end of said first trajectory, while recording subsequent reference positions;

then, after reaching the end of said first trajectory, subsequently displacing the light beam along the second trajectories corresponding to the recorded reference positions.

The second trajectories can include a substantial number of points of each element or a region of each element in order to obtain an overall surface plot of the slope, displacement and/or vibration of said element or said region of said element.

The first trajectory can, for example, be a substantially straight trajectory in a first direction.

The second trajectories can be, for example, substantially straight trajectories in a direction substantially perpendicular to the first trajectory (an option that can be suitable when, for example, the purpose is to detect the longitudinal curvature of cantilevers arranged in parallel in a cantilever array).

The second trajectories can alternatively be, for example, substantially straight trajectories in a direction substantially parallel to the first trajectory (this configuration can be appropriate when the purpose is to measure the longitudinal curvature of elements arranged one after another in their longitudinal direction, such as cantilevers arranged in subsequent holes in a silicon substrate or similar, or when the purpose is to detect torsion around the longitudinal axis of a plurality of elements arranged in parallel, such as paddles or cantilevers of an array).

The first and/or the second trajectories can also be, for example, meandering, zigzag, sinusoidal and/or circular trajectories, and they can have any suitable relation to the first trajectories.

The mechanical structure can be, for example, a cantilever array; if so, then the elements can be the cantilevers of said cantilever array.

The system can further be arranged to store and/or treat the position signal outputs as data indicative of surface displacement (corresponding to, for example, the relative displacement or slope of the surface) and/or vibration characteristics of a corresponding element of the mechanical structure, along the corresponding second trajectories.

Another aspect of the invention relates to a method of surface inspection for detecting relative displacement (corresponding to, for example, an increase in the slope of a part or region of an element) and/or vibration characteristics of a plurality of points of a plurality of elements forming part of a mechanical structure, said method comprising the steps of:

directing a light beam towards said mechanical structure and producing a relative displacement of said light beam with respect to the mechanical structure so as to scan said mechanical structure with the light beam;

receiving a light beam reflected off said mechanical structure, with a position sensitive detector arranged to produce at least one output signal in response to receipt of said light beam (for example, a photodetector or similar arranged to produce an output signal or a set of output signals which, on the one hand, depends on the position of an incident light beam on said photodetector and, on the other hand, on the intensity of the light of the incident light beam);

wherein the step of producing a relative displacement of said light beam with respect to the mechanical structure is performed so that the light beam is displaced along the mechanical structure along a first trajectory.

According to the invention, the method further comprises the step of detecting a plurality of subsequent reference positions along said first trajectory, said reference positions being determined by analysing at least one output signal from said position sensitive detector.

The step of producing a relative displacement of said light beam with respect to the mechanical structure is further performed so as to also displace the light beam along the mechanical structure along a plurality of second trajectories, each of said second trajectories being associated with one of said reference positions.

The method further includes obtaining, during displacement of the light beam along each of said second trajectories, a plurality of position signal outputs from said position sensitive detector.

What has been stated in connection with the description of the system is also applicable to the method, mutatis mutandis.

For example, the reference positions can be determined by analysing the amplitude (for example, the position-dependence of said amplitude) of said at least one output signal from said position sensitive detector.

A position can be determined to be a reference position in accordance with different criteria, for example:

when said position corresponds to a local maximum in the amplitude of said at least one output signal from said position sensitive detector;

when said position corresponds to a local minimum in the amplitude of said at least one output signal from said position sensitive detector;

when said position corresponds to a local maximum of slope in the amplitude of said at least one output signal from said position sensitive detector; or when said position corresponds to a position having a specified relation to positions corresponding to local maxima and/or minima in the amplitude of said at least one output signal from said position sensitive detector;

as explained above.

The amplitude of said at least one output signal from said position sensitive detector can be indicative of the intensity of the light beam received by the position sensitive detector.

The step of producing a relative displacement of said light beam with respect to the mechanical structure can be performed so that:

the light beam is displaced along said first trajectory; upon detection of a reference position, displacement of the light beam along said first trajectory is interrupted and instead the light beam is displaced along a second trajectory corresponding to said reference position; and subsequently, displacement of the light beam along said first trajectory is continued, until a subsequent reference position is detected; or the light beam is displaced along said first trajectory until reaching an end of said first trajectory, while recording subsequent reference positions; and then, after reaching the end of said first trajectory, the light beam is subsequently displaced along the second trajectories corresponding to the recorded reference positions.

The method can further comprise the step of storing and/or treating said position signal outputs as data indicative of surface slope, displacement and/or vibration characteristics of a corresponding element of the mechanical structure, along the corresponding second trajectories.

A further aspect of the invention relates to a program such as a computer program, comprising program instructions for causing an electronic programmable system (comprising, for example, a personal computer or other programmable electronic control means) to carry out the method of the invention, when the program is executed in said electronic programmable system. The system can further comprise the light source, the position sensitive detector and the scan means, as outlined above. The program can be embodied on a record medium (such as a magnetic or optical record medium, such a computer memory or a read-only memory) or it can be carried on an electrical carrier signal.

BRIEF DESCRIPTION OF THE DRAWINGS

To complete the description and in order to provide for a better understanding of the invention, a set of drawings is provided. Said drawings form an integral part of the description and illustrate a preferred embodiment of the invention, which should not be interpreted as restricting the scope of the invention, but just as an example of how the invention can be embodied. The drawings comprise the following figures.

DESCRIPTION OF A PREFERRED EMBODIMENT OF THE INVENTION

Figure 1:
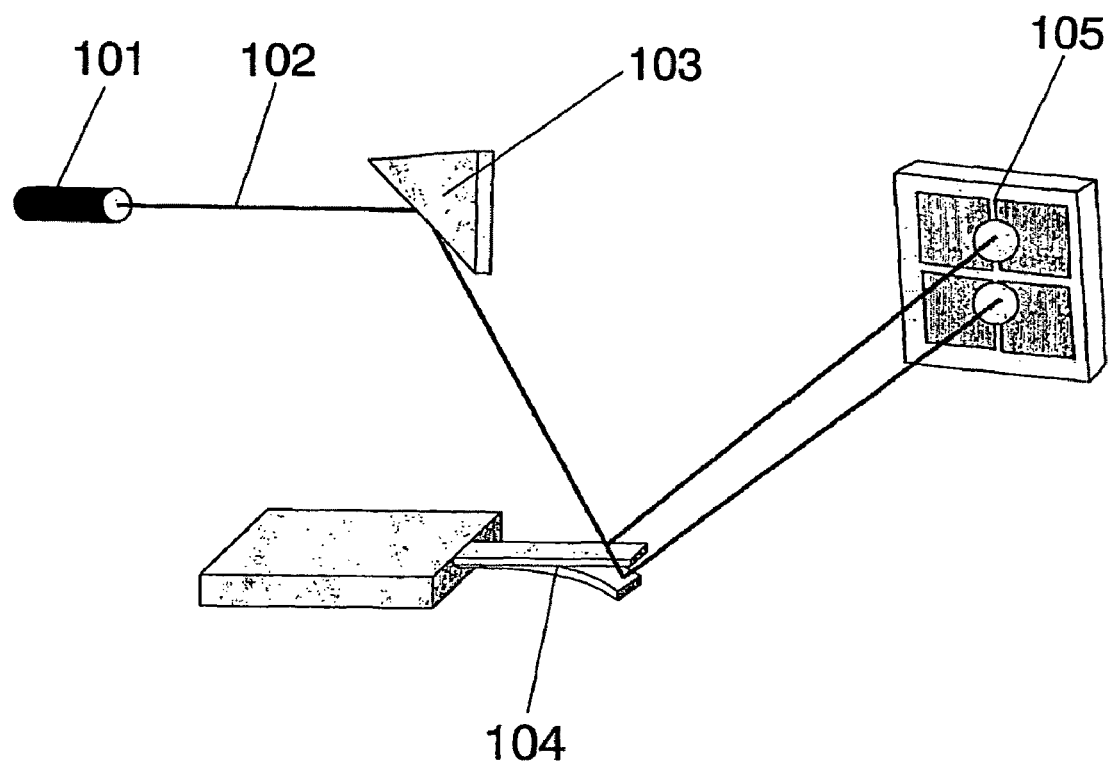
FIG. 1 is a schematic view of a prior art system for cantilever read-out based on the optical beam deflection technique for measuring micro-cantilever deflection.
Figure 2:
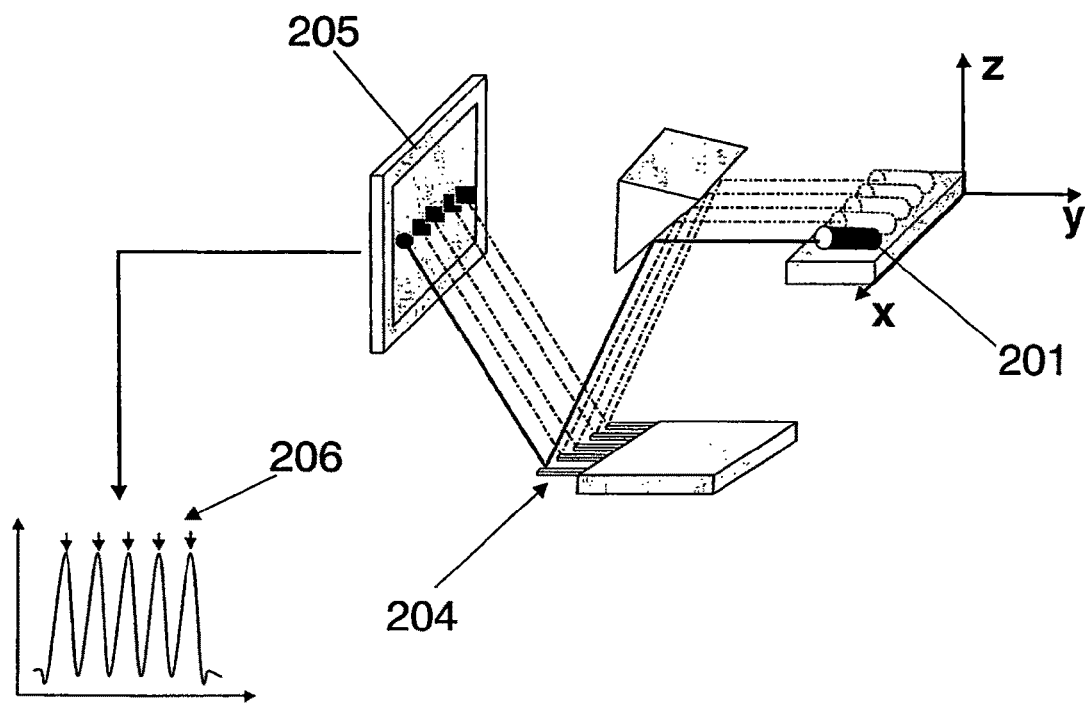
FIG. 2 is a schematic view of a prior art system in which a laser beam is used to scan a micro-cantilever array.
Figure 3A:
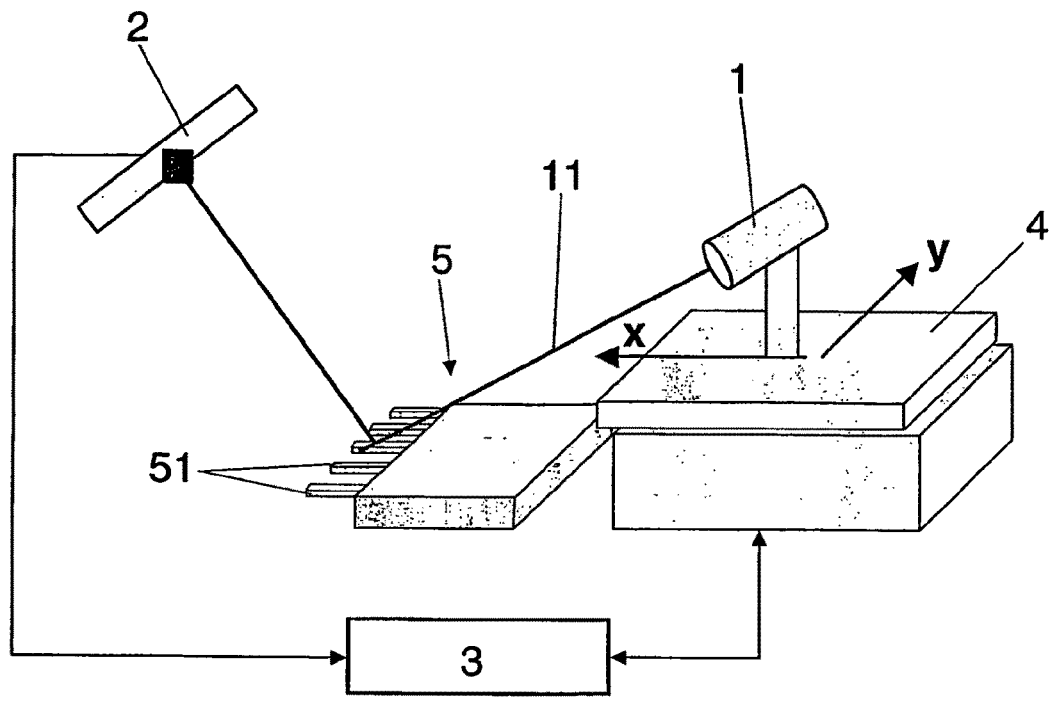
FIGS. 3A and 3B is a schematic view of an embodiment of the invention.

FIG. 3A illustrates a schematic view of an embodiment of the invention, in which a light source 1 comprising a laser diode is used to generate a laser beam 11 which is used to scan a micromechanical structure 5 comprising a plurality of cantilevers 51, each having a clamped end and a free end.

A position sensitive detector 2 made up of a photodetector is arranged to receive the light beam after reflection off the cantilevers 51, and to produce three output signals, one having an amplitude that depends on the intensity of the light that hits the position sensitive detector 2, and the other two having an amplitude that depends on the coordinates of the position where the light hits said position sensitive detector.

Thus, the cantilevers 51 are differentiated from the gaps separating the cantilevers due to an increase of the photocurrent in the position sensitive detector, when light is reflected off a cantilever, in a manner similar to the manner disclosed in Mar Alvarez and Javier Tamayo, "*Optical sequential readout of microcantilever arrays for biological detection*", Sensors and Actuators B 106 (2005), pp. 687-690 (referred to above).

The laser diode 1 is mounted on a scanning device 4 for scanning the laser beam 11 along different paths along the mechanical structure 5, basically in the XY plane defined by the cantilevers 51 (in their ideal non-bent position). The scanning device 4 is, in this embodiment of the invention, based on two perpendicular linear voice coil actuators that are based on the Lorentzian force between a tubular coil and a permanent magnet. Voice coil actuators normally allow a motion range of few millimeters, speeds from 0.1 to several mm/s and an accuracy of 100 nm. However, other methods can be used such as linear motors, piezoelectric actuators, etc. In addition, an intermediate mirror can be used for scanning the laser beam by controlling the tilt angle.

As outlined above, the reflected laser beam is collected in a position sensitive (photo)detector (PSD) providing output signals indicative of the total light intensity and of the position of the reflected spot, that is, of the spot where the reflected laser beam hits the relevant surface of the detector.

Further, an electronic control system 3 is provided that is connected to the position sensitive detector to receive and analyse the output signals from said position sensitive detector 2, and to the scanning device 4 so as to control the scanning device 4, in accordance with a program stored in said electronic control system.

At the points of high total photocurrent collected by the position sensitive detector (for example, higher than a threshold value, or corresponding to local maxima in the total photocurrent, whereby said local maxima can be easily detected using appropriate standard software routines), the position coordinates of the reflected spot on the PSD are measured. As in the optical beam deflection technique, the main contribution to changes in the position of the reflected laser spot on the position sensitive detector corresponds to changes in the tilt angle (slope) $\alpha$ of the cantilever, which gives a motion s of the reflected laser spot on the position sensitive detector given by $s \cong 2 D\alpha$ for $\alpha \ll 1$, where D is the distance between the cantilever and the position sensitive detector 2, as shown schematically in FIG. 4, where the slope of a cantilever is increased an angle $\alpha$. The distance s between the incidence on the position sensitive detector 2 of the laser beam 11A before the increase of the slope and the laser beam 11B after the increase of the slope are illustrated schematically in FIG. 4.

The changes of the tilt angle that are contained in the plane formed by the incident and reflected laser beams and those in the perpendicular plane can be decoupled by measuring the coordinates of the reflected laser spot on the position sensitive detector along one axis contained on the incidence-reflection plane and the other one in the perpendicular direction.

Figure 3B:
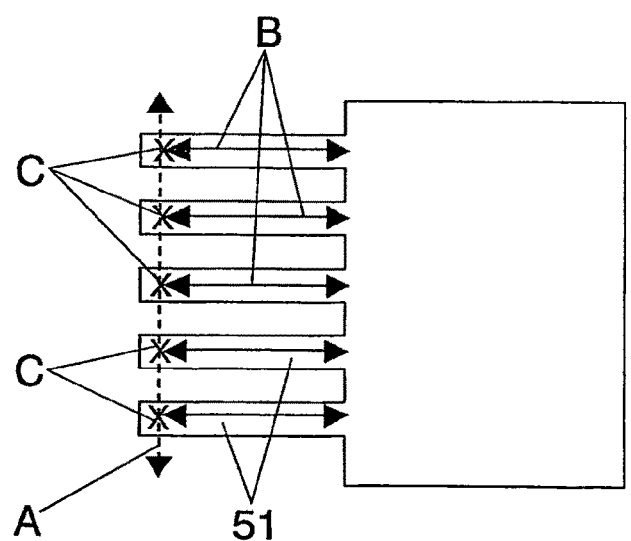

In this embodiment of the invention, it is intended to measure the profile of the cantilevers 51 along their longitudinal axes. Thus, in accordance with the principles underlying the invention, the laser beam 11 is first scanned in a first direction (trajectory A in FIG. 3B) perpendicular to the array in order to illuminate the free ends of the cantilevers. Maxima of photocurrent are obtained in the linear position sensitive detector 2 at the laser beam positions where the free ends of the cantilevers are illuminated. These positions, corresponding to local maxima of the photocurrents generated in the position sensitive detector 2, are used as the reference starting points (reference positions C in FIG. 3B) to perform a second scan along each cantilever (second trajectories B). This process is automated and controlled by the electronic control system, embodied in a personal computer (PC).

During the second trajectories, the position signals (signals identifying the position of incidence of the reflected laser beam on the position sensitive detector) are read out from the position sensitive detector and stored. These pieces of data can then easily be used to obtain an estimate of the profile of the surface of the cantilevers 51 along the second trajectories B.

Figure 4:
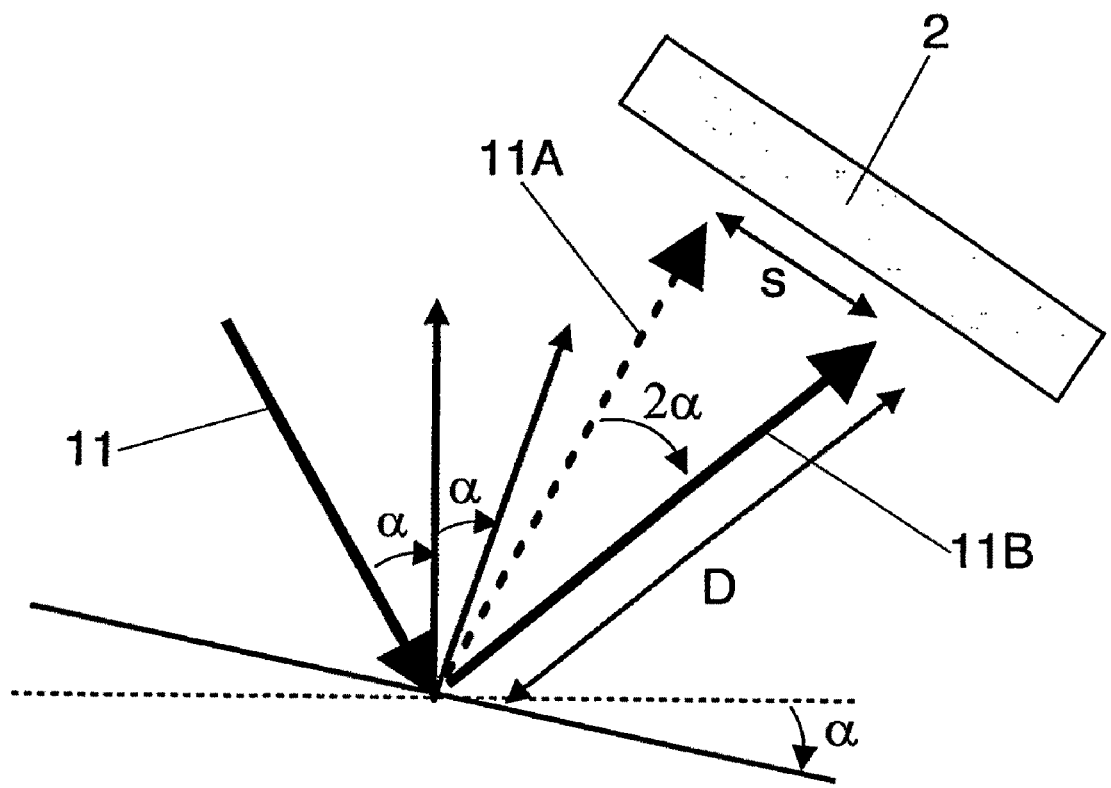
FIG. 4 is a schematic illustration of the displacement of the reflected laser light on the position sensitive detector, when the slope of a surface (for example a region of a cantilever) changes, using the optical beam deflection technique.

The vertical displacement of each cantilever can be described by a function that depends on the coordinate along the cantilever length, z(x). The tilt angle at each x position where the laser beam is hitting is approximately given by dz/dx. Therefore, the position of the reflected laser beam on the PSD is described by $$s(x) \cong 2D\frac{dz}{dx}(x) + x\cos\beta,$$

where the second summand accounts for the effect of the laser beam displacement and β is the angle between the incident laser beam and the cantilever at its rest position (cf. FIG. 4). Integrating the output signal s(x) from the position sensitive detector, the cantilever profile z(x) can be obtained as:

$$z(x) = \frac{1}{2D}\int_0^x s(x')dx' - \frac{1}{4}\frac{x^2}{D}\cos\beta \quad (1)$$

Figures 5A, 5B:
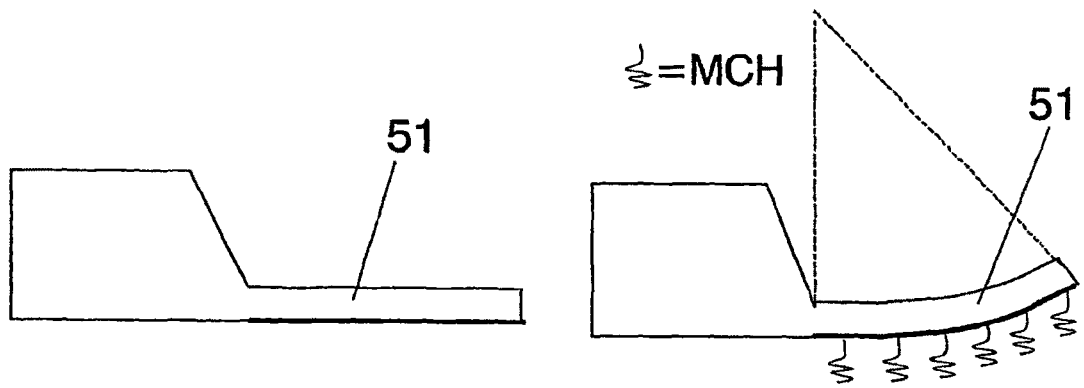
FIGS. 5A-5C illustrate an experiment based on the present invention.
Figure 5C:
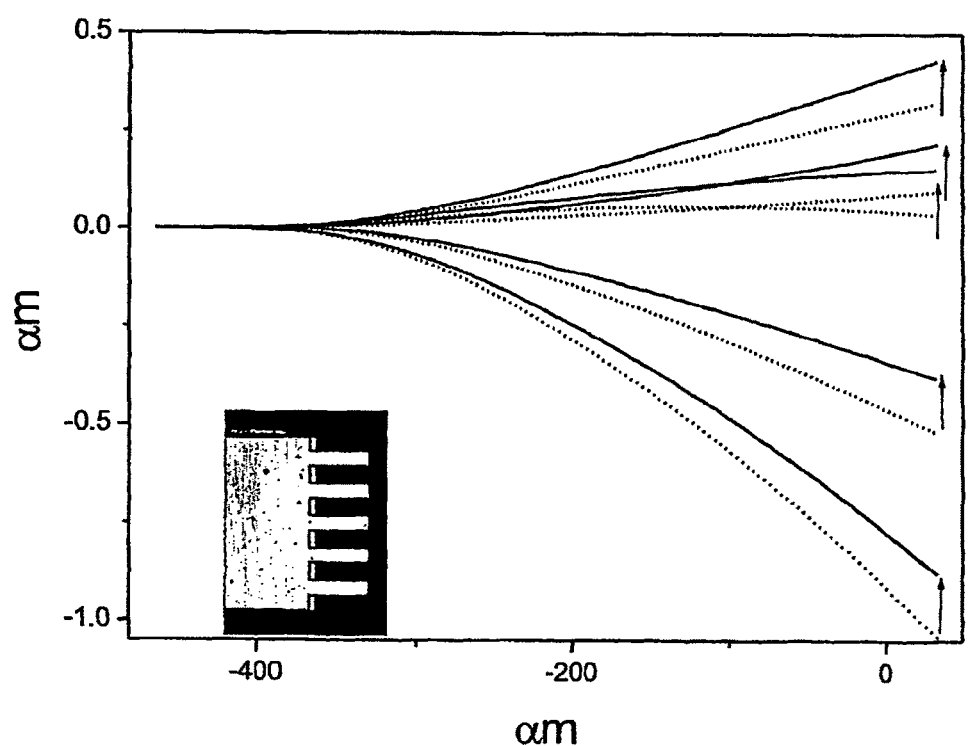

This particular embodiment of the invention was applied to obtain the profile of five silicon cantilevers (400 μm long, 100 μm wide, and 1 μm thick) belonging to an array during a molecular adsorption experiment. The cantilevers were previously coated with a thin gold layer on their bottom side. The different surfaces on both sides of each cantilever (top→silicon, bottom→gold) imply differences between said surfaces in what regards their adsorption of molecules. This produces a difference in surface stress that translates into bending of the cantilevers. This embodiment of the invention was tested by measuring the profile of the microcantilever array in water during the injection in the fluid cell, where the array was allocated, of an organic molecule called 6-mercapto-1-hexanol (MCH), that avidly adsorb on gold surfaces due to the strong bond formed between the thiol group of the MCH and the gold. This strong adsorption does not occur on the silicon surface. A schematic representation of the experiment is shown in FIGS. 5A-5C. FIG. 5A shows a cross section of the silicon structure including silicon cantilevers 51 having a 40 nm thick gold layer at their bottom surface, to adsorb the MCH, before receiving the MCH. FIG. 5B shows the same structure as FIG. 5A, but after adsorbing MCH, whereby the cantilevers show a bent profile: the differential surface stress between the gold and silicon surfaces produce a cantilever bending and a change of the curvature radius. FIG. 5C shows the measured profiles of the five microcantilevers belonging to an array before and after MCH adsorption, applying equation (1) above. In FIG. 5C, the vertical axis represents the cantilever profile (in μm), and the horizontal axis represent the longitudinal distance along the cantilever from the root of each cantilever (also in μm). The dotted lines represent the profile before adsorption of MCH, and the straight lines represent the profile after adsorption of MCH. In the experiment, the separation between the cantilevers was 250 μm.

Figure 6A:
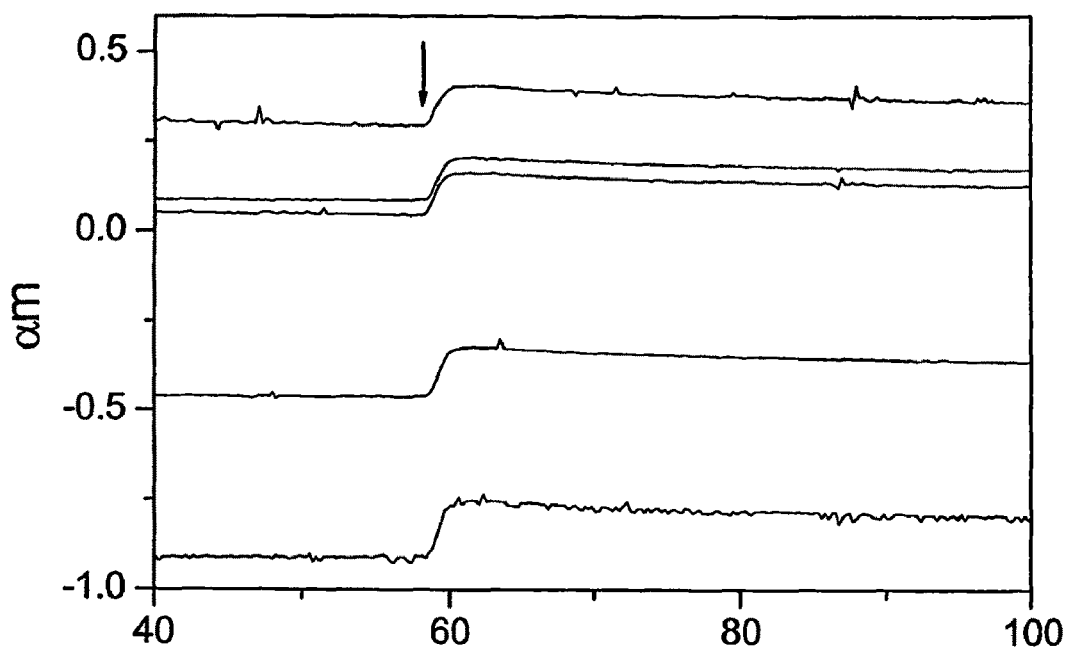
FIGS. 6A and 6B illustrate curves obtained with an embodiment of the present invention, corresponding to real-time measurement of the absolute displacement of the cantilever end (FIG. 6A) and of the absolute curvature radius (FIG. 6B) of a plurality of micro-cantilevers during the adsorption of MCH.
Figure 6B:
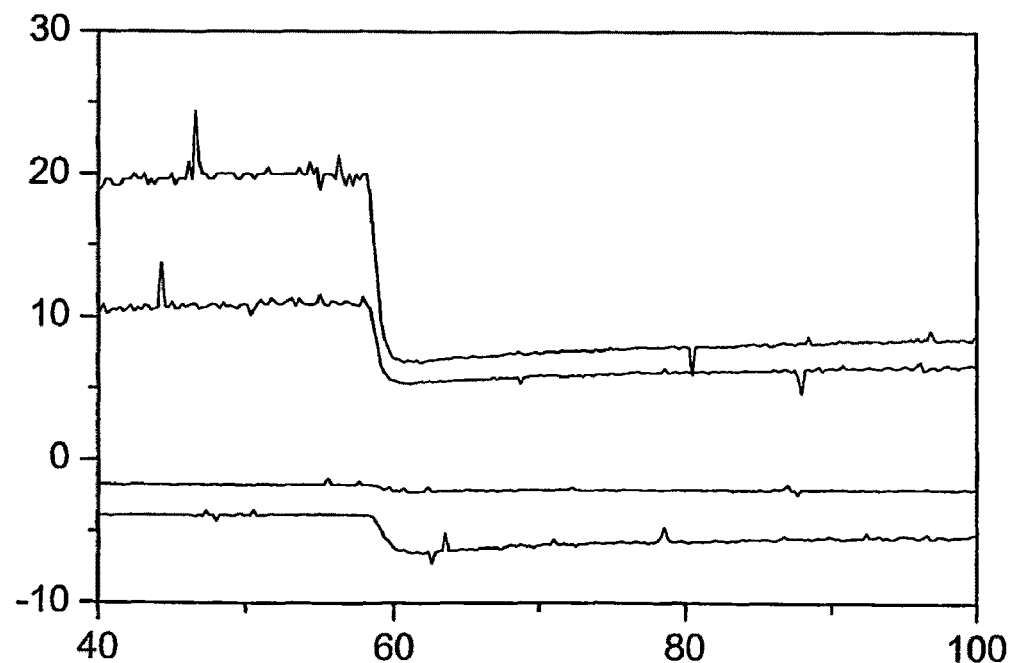

The profiles of the five microcantilevers can be measured in real-time, and they can be obtained in less than one second, a time much lower than the typical time taken by surface reactions and molecular adsorption (of the order of minutes). Thus, using the invention, it is possible to measure the evolution of the cantilever profile during the molecular adsorption, and parameters such as the displacement of the cantilever ends and curvature radius can be obtained in real-time. FIGS. 6A and 6B schematically show real-time experimental measurements of the absolute displacement of the cantilever ends (FIG. 6A) and of the absolute curvature radius (FIG. 6B) of the five microcantilevers during the adsorption of MCH (indicated by the arrow) (in FIG. 6B, only the curves corresponding to four cantilevers are shown). The timescale is on the horizontal axis and the numbers given correspond to minutes.

The cantilever profile is obtained by applying eq. 1 by processing the data obtained from the position sensitive detector by the electronic control system during the second trajectories. The position dependence of the position sensitive detector outputs can be filtered, smoothed, derived and integrated by using numerical algorithms. Thus, relevant data such as the cantilever profile, average curvature, local curvature at some points of interest, displacement of the free cantilever end and other parts, change of slope at several points along the cantilever etc. can be quickly obtained in real-time by suitably programming the electronic control system, a task that can be easily performed by the person skilled in the art.

These more complete data of the profiles of the cantilevers provide more information about the reaction on the cantilever surface than what is obtained using the conventional optical beam deflection techniques, which merely provide data on the variations of the local slope at the cantilever end. In addition, the technique provides absolute values of the cantilever profile rather than relative variations of the local slope. In other words, using the conventional optical beam deflection techniques, temporal variations of the local slope at the cantilever end can be determined. This information can hardly be recovered once that the cantilever is removed from the device that comprises the optical system, i.e., the laser source and the photodetector. However, the present invention provides the absolute profiles of the cantilever. Thus the cantilever can be processed separate from the device comprising the optical detection system. This can, for instance, be relevant for genomic and proteomic application, in which, for instance, the cantilevers forming part of a dense array are each functionalised with a receptor (proteins or nucleic acids). The cantilever array is processed with the sample to be measured (for instance, the RNA or protein product of a set of cells or tissue). After exposure of the cantilevers to the sample, and washing steps, the cantilever array can be mounted again on the device for measuring the profile of each cantilever so as to compare the new profile with the original profile. The change of the profile can be related to the amount of genes expressed or proteins present in the analysed cells or tissue.

Actually, to obtain the real displacement of cantilever ends all data of the profile are necessary. In the prior arrangements based on the optical beam deflection technique, only an estimation of the displacement at the end of the cantilever can be obtained, that relies on several approximations. This also applies to the determination of the curvature radius of a cantilever.

In another application of the above described embodiment of the invention, it was wished to obtain a map of the tilt angles (deformation) of the cantilevers along the longitudinal axis and in also in the perpendicular direction. As in the previous example, a first scan (trajectory A in FIG. 3B) is performed in order to illuminate the free ends of the cantilevers belonging to the array. Reference positions (C) were determined in correspondence with the positions that gave maxima of reflected light intensity in the position sensitive detector (positions illustrated by the "suns" in FIG. 7), which corresponded to the reflection of the light off the free ends of the cantilevers. Associated to those reference positions, an area associated to each microcantilever is scanned by making several parallel scans (trajectories B in FIG. 7) along the long axis of the cantilevers. The scan along the first trajectory and second trajectories are represented by a discontinuous line and by continuous lines, respectively, in FIG. 7.

Figure 7:
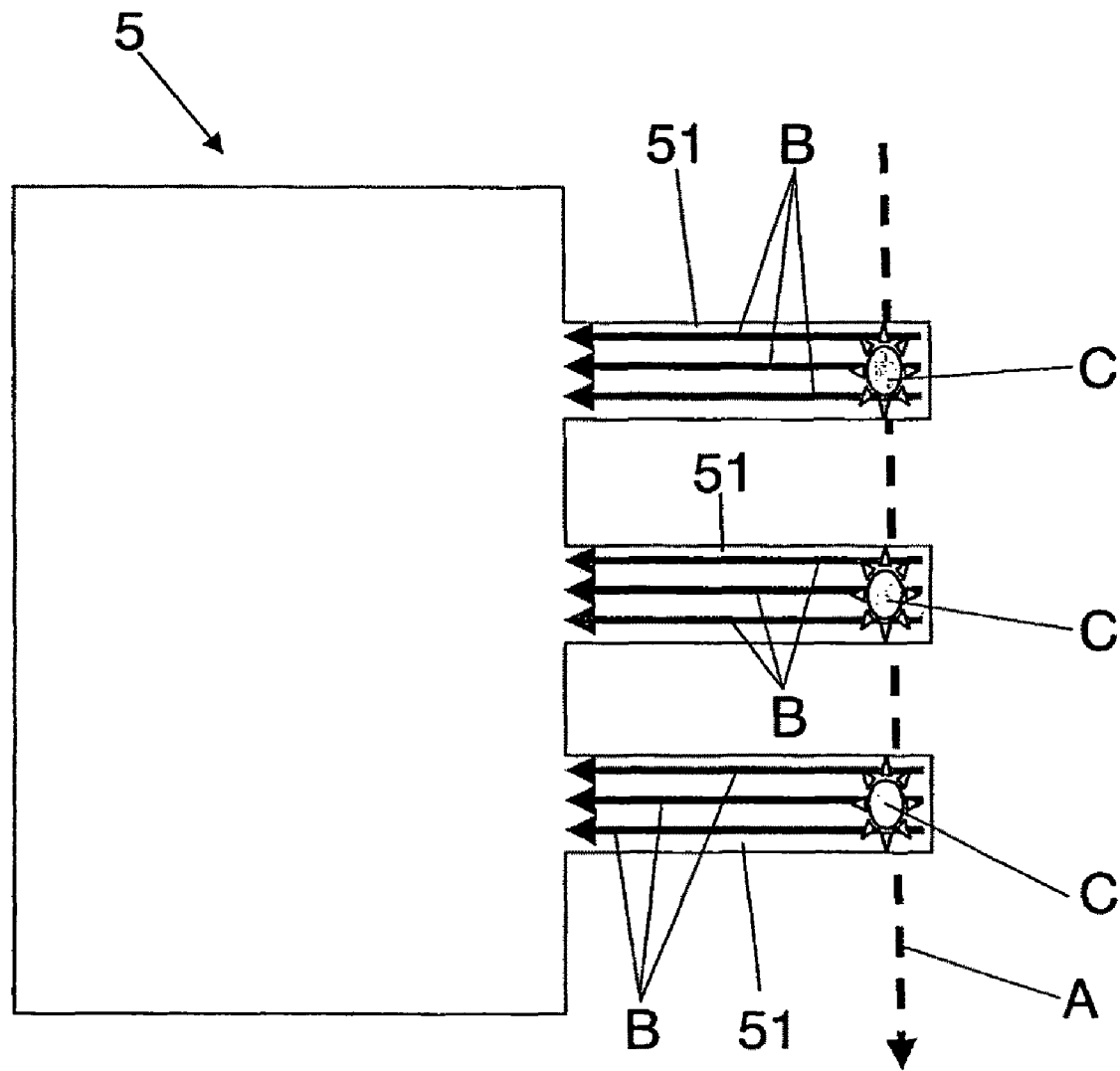
FIG. 7 shows the scanned trajectories in accordance with an experiment based on an embodiment of the invention.
Figure 8A:
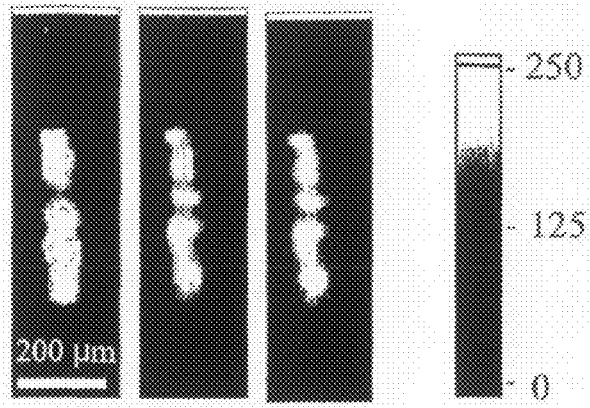
FIGS. 8A-8C show output signals from the position sensitive detector in correspondence with said experiment.
Figure 8B:
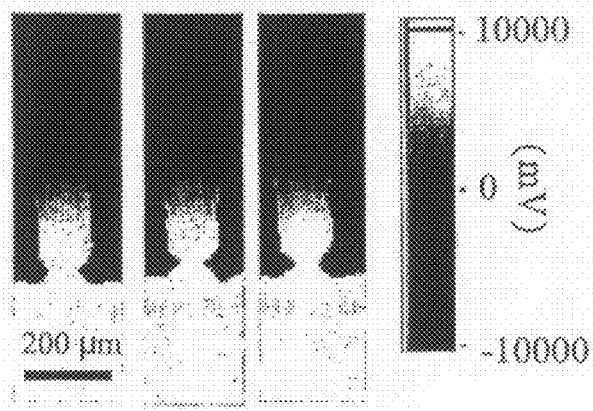
Figure 8C:
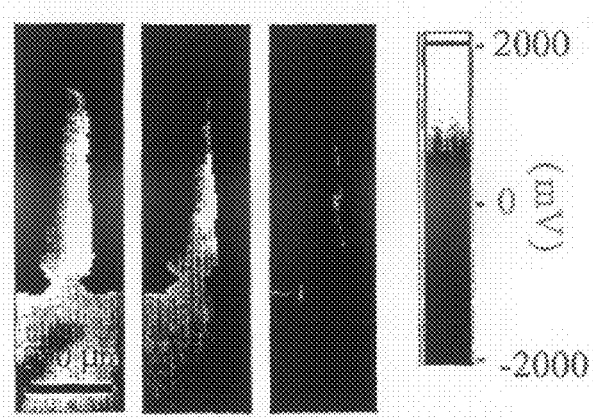

FIGS. 8A-8C show the measured output signals from the position sensitive detector as a function of the relative positions of the illuminating laser beam obtained during the scan along trajectories B in FIG. 7. The trajectories B were selected to scan three cantilevers belonging to the array. The position sensitive detector used was a two-dimensional linear position sensitive photodetector, that provide three electrical outputs, one that is approximately proportional to the intensity the light that illuminates the photodetector, and the other two that are approximately proportional to the coordinates (along the orthogonal axes of the surface of the photodetector) of the centroid of the light that illuminates the photodetector. The map of the output indicative of the total light intensity reflected off each microcantilever is shown in FIG. 8A (the scale on the right hand of FIG. 8A shows the total intensity output from the position sensitive detector in mV). FIG. 8B shows a map of the output signal from the position sensitive detector corresponding to the coordinates of the reflected light beam on the y-axis of the position sensitive detector (the scale on the right hand of FIG. 8B represents the y-axis output from the position sensitive detector in mV). The position sensitive detector is arranged in such a way that its y-axis and the longitudinal axis of the cantilevers are both contained in the plane formed by the incident and reflected light beams. Therefore, the y-axis output is indicative of the slope along the longitudinal axis of the cantilevers. The increasing slope from the clamping end to the free end of a cantilever indicates that the cantilevers are not straight, but are bent. FIG. 8C shows a map of the output signal from the position sensitive detector corresponding to the x-coordinate of the reflected light beam on the position sensitive detector (the scale on the right hand represents the output corresponding to the x-axis in mV). This signal is indicative of the deformation (torsion) or slope of the cantilever in the direction perpendicular to the longitudinal axis. The data indicates that there is a significant torsional deformation of the cantilevers.

Figure 9A:
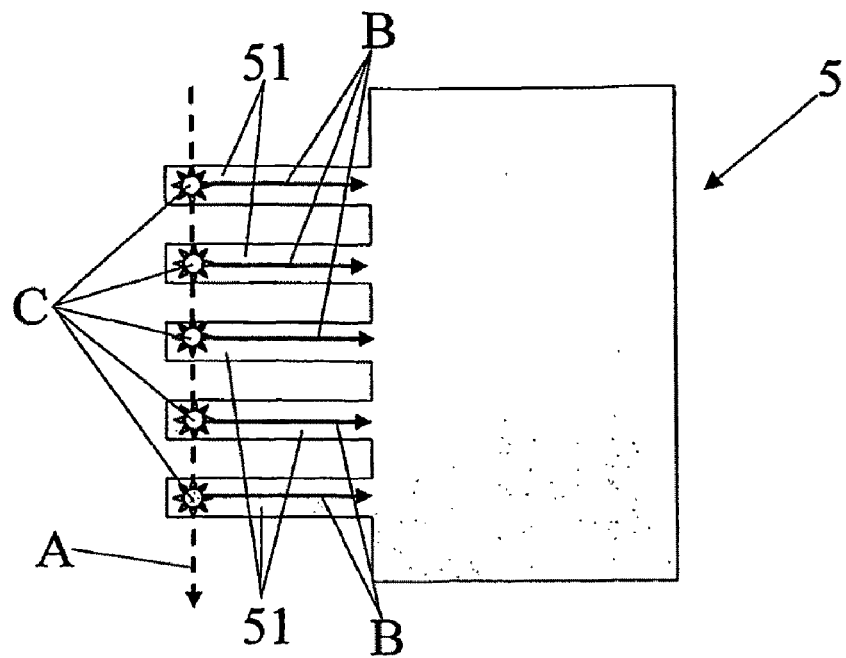
FIGS. 9A-9D show different examples of possible implementations of the first and second trajectories.

Of course, a large number of different trajectories can be chosen for the first and second trajectories. FIG. 9A shows a first example of said trajectories, similar to the ones referred to above, that is, performing a scan in a first direction according to the first trajectory A and then performing the second trajectories B in a direction perpendicular to the first direction (in FIGS. 9A-9D, the "suns" illustrate points corresponding to "maximum reflection" of the light beam and, thus, to a maximum amplitude of the photocurrents generated in the position sensitive detector).

Figure 9B:
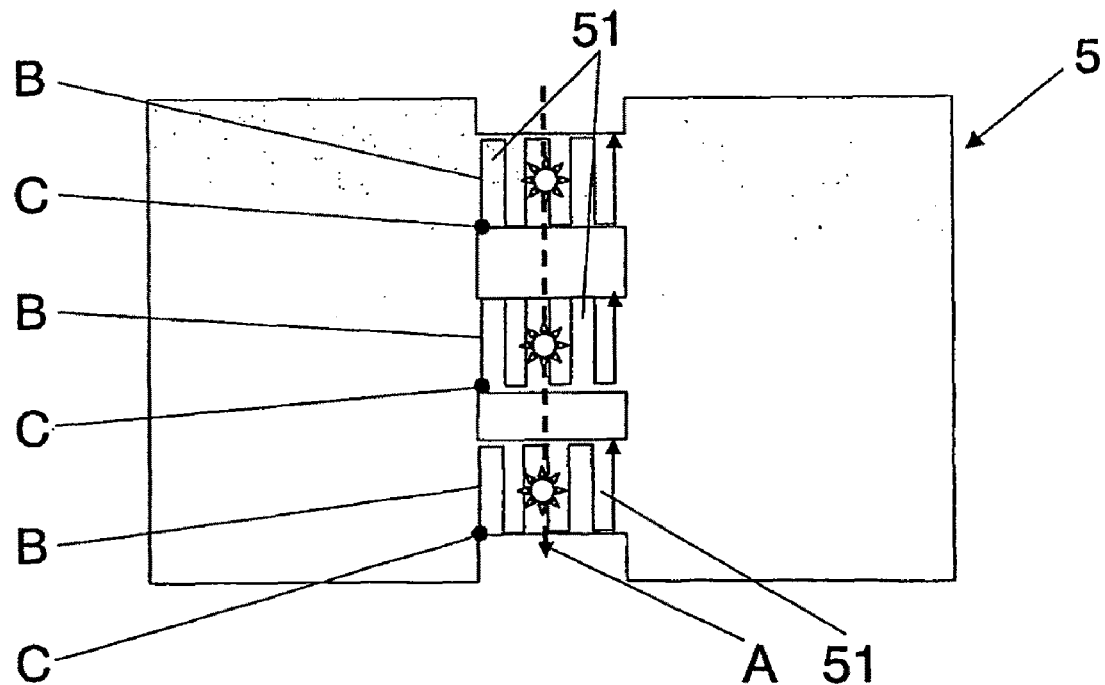

FIG. 9B shows an alternative embodiment, wherein the reference positions are offset from the positions covered by the first trajectory A (for example, defined as having a specific relation to points of maximum reflection along the first trajectory), and wherein the second trajectories B follow a meandering path, crossing said first trajectory. This embodiment can be useful for obtaining a surface map of displacement and/or vibration of the mechanical elements 51.

Figure 9C:
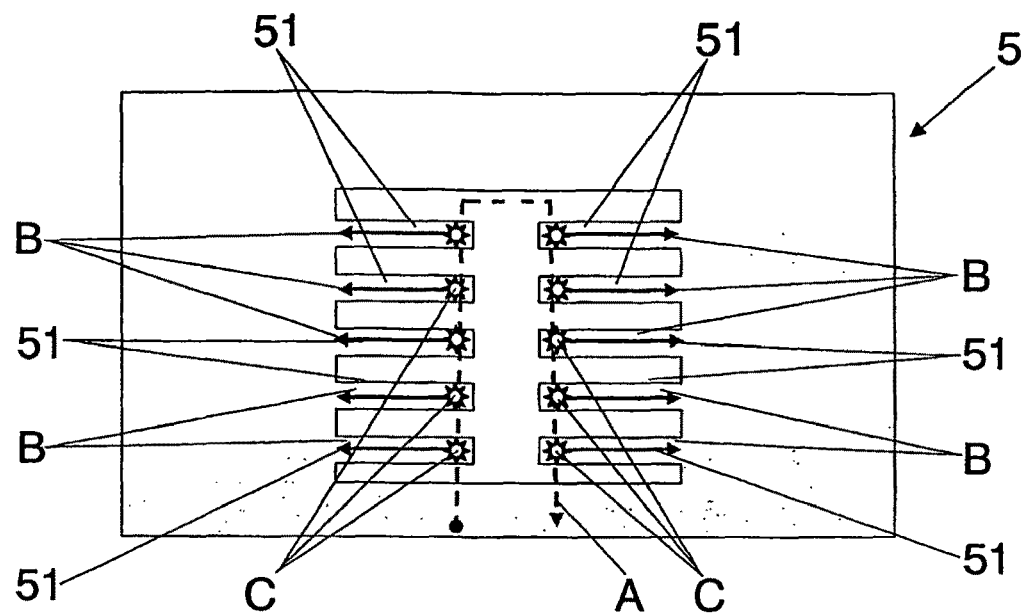

FIG. 9C shows a further embodiment in which a "U" shaped scan is made along a first trajectory A, and wherein the second trajectories are perpendicular to the first trajectory in an "outwards" direction.

Figure 9D:
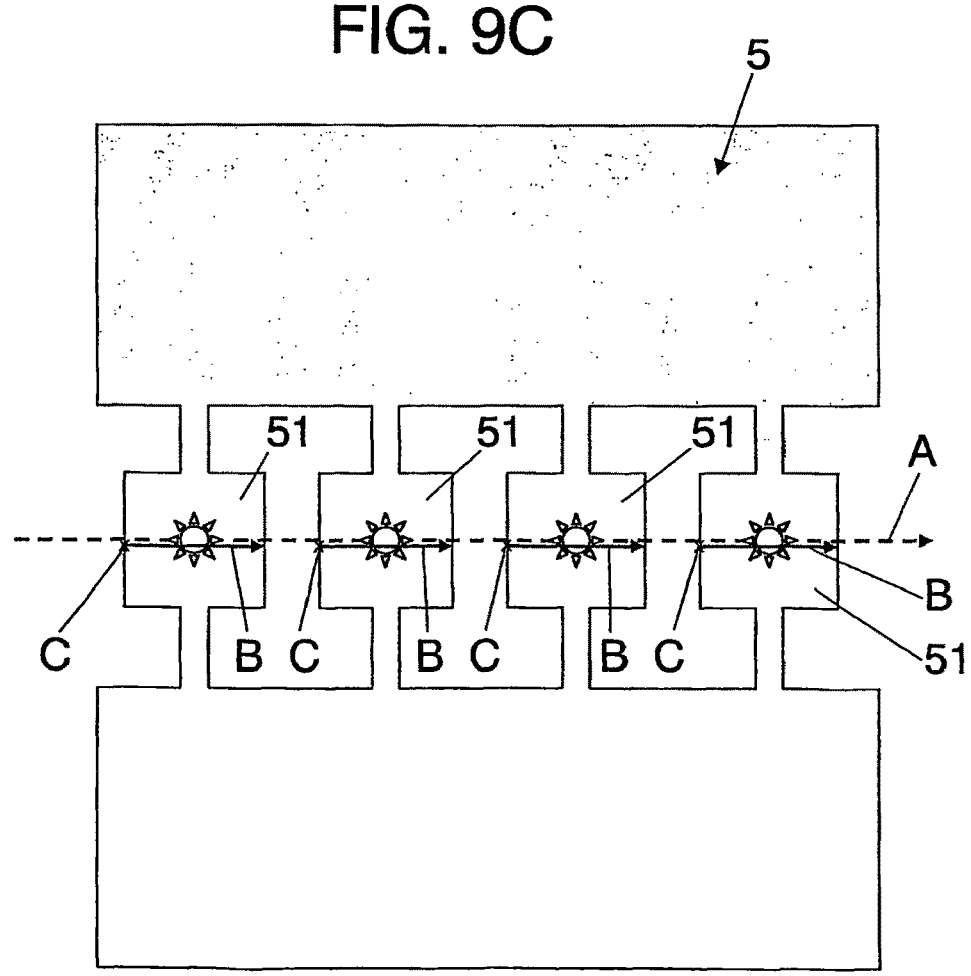

Finally, FIG. 9D shows an embodiment in which the second trajectories B are parallel with said first trajectory A and, actually, coincide with parts of said first trajectory. This option can be of interest, for example, when the mechanical elements are separate cantilevers arranged in subsequent holes in a substrate along the first trajectory, or where the mechanical elements 51 are, as illustrated in FIG. 9D, hinged devices arranged in parallel along the first trajectory, whereby it is intended to measure the torsion of these devices.

In this text, the term "comprises" and its derivations (such as "comprising", etc.) should not be understood in an excluding sense, that is, these terms should not be interpreted as excluding the possibility that what is described and defined may include further elements, steps, etc.

On the other hand, the invention is obviously not limited to the specific embodiment(s) described herein, but also encompasses any variations that may be considered by any person skilled in the art (for example, as regards the choice of materials, dimensions, components, configuration, etc.), within the general scope of the invention as defined in the claims.

The invention claimed is:

1. System for surface inspection arranged to detect relative displacement and/or vibration characteristics of a plurality of points of a plurality of elements (51) forming part of a mechanical structure (5), said system comprising:
   a light source (1) arranged to generate at least one light beam (11);
   a position sensitive detector (2) arranged to receive the light beam when reflected off the mechanical structure (5) and to produce at least one output signal in response to receipt of said light beam;
   an electronic control system (3);
   scan means (4) for relative displacement of said light beam with respect to the mechanical structure (5) so as to scan said mechanical structure with the light beam, following instructions from the electronic control system (3);
   wherein said electronic control system (3) is arranged to control the scan means (4) so as to displace the light beam along the mechanical structure along a first trajectory (A), so as to detect a plurality of subsequent reference positions (C) along said first trajectory (A), wherein said electronic control system (3) is operatively associated with said position sensitive detector (2) so as to determine said reference positions (C) as a result of an analysis of at least one output signal from said position sensitive detector (2);
   wherein said electronic control system (3) is further arranged to control the scan means (4) so as to displace the light beam along the mechanical structure along a plurality of second trajectories (B), each of said second trajectories (B) being associated with one of said reference positions (C);
   said electronic control system further being arranged to obtain, during displacement of the light beam along each of said second trajectories (B), a plurality of position signal outputs from said position sensitive detector (2).

2. System according to claim 1, wherein the electronic control system (3) is operatively associated with said position sensitive detector (2) so as to determine said reference positions (C) as a result of an analysis of the amplitude of said at least one output signal from said position sensitive detector (2).

3. System according to claim 2, wherein the electronic control system (3) is operatively associated with said position sensitive detector (2) so as to determine that a position is a reference position when said position corresponds to a local maximum in the amplitude of said at least one output signal from said position sensitive detector (2).

4. System according to claim 2, wherein the electronic control system (3) is operatively associated with said position sensitive detector (2) so as to determine that a position is a reference position when said position corresponds to a local minimum in the amplitude of said at least one output signal from said position sensitive detector (2).

5. System according to claim 2, wherein the electronic control system (3) is operatively associated with said position sensitive detector (2) so as to determine that a position is a reference position when said position corresponds to a local maximum of slope in the amplitude of said at least one output signal from said position sensitive detector (2).

6. System according to claim 2, wherein the electronic control system (3) is operatively associated with said position sensitive detector (2) so as to determine that a position is a reference position when said position corresponds to a position having a specified relation to positions corresponding to local maxima and/or minima in the amplitude of said at least one output signal from said position sensitive detector (2).

7. System according to claim 2, wherein the amplitude of said at least one output signal from said position sensitive detector (2) is indicative of the intensity of the light beam received by the position sensitive detector.

8. System according to claim 1, wherein said electronic control system is arranged to:
  displace the light beam along said first trajectory (A);
  upon detection of a reference position (C), interrupt displacement of the light beam along said first trajectory (A) and instead displace the light beam along a second trajectory (B) corresponding to said reference position (C);
  subsequently, continue displacement of the light beam along said first trajectory (A) until detecting a subsequent reference position (C).

9. System according to claim 1, wherein said electronic control system is arranged to:
  displace the light beam along said first trajectory (A) until reaching an end of said first trajectory (A), while recording subsequent reference positions (C);
  then, after reaching the end of said first trajectory (A), subsequently displacing the light beam along the second trajectories (B) corresponding to the recorded reference positions (C).

10. System according to claim 1, wherein said second trajectories (B) include a substantial number of points of each element or a region of each element in order to obtain a overall surface plot of the slope, displacement and/or vibration of said element or said region of said element.

11. System according to claim 1, wherein the first trajectory (A) is a substantially straight trajectory in a first direction.

12. System according to claim 1, wherein said second trajectories (B) are substantially straight trajectories in a direction substantially perpendicular to the first trajectory (A).

13. System according to claim 1, wherein said second trajectories (B) are substantially straight trajectories in a direction substantially parallel to the first trajectory (A).

14. System according to claim 1, wherein the first and/or the second trajectories are meandering and/or zigzag trajectories.

15. System according to claim 1, wherein the mechanical structure (5) is a cantilever array and wherein the elements (51) are cantilevers of said cantilever array.

16. System according to claim 1, said system further being arranged to store and/or treat said position signal outputs as data indicative of surface displacement and/or vibration characteristics of a corresponding element (51) of the mechanical structure (5), along the corresponding second trajectories (B).

17. Method of surface inspection for detecting relative displacement and/or vibration characteristics of a plurality of points of a plurality of elements (51) forming part of a mechanical structure (5), said method comprising the steps of:
  directing a light beam (11) towards said mechanical structure and producing a relative displacement of said light beam with respect to the mechanical structure (5) so as to scan said mechanical structure with the light beam;
  receiving a light beam reflected off said mechanical structure, with a position sensitive detector (2) arranged to produce at least one output signal in response to receipt of said light beam;
  wherein the step of producing a relative displacement of said light beam with respect to the mechanical structure (5) is performed so that the light beam is displaced along the mechanical structure along a first trajectory (A), the method further comprises the step of detecting a plurality of subsequent reference positions (C) along said first trajectory (A), said reference positions (C) being determined by analysing at least one output signal from said position sensitive detector (2);
  wherein the step of producing a relative displacement of said light beam with respect to the mechanical structure is further performed so as to also displace the light beam along the mechanical structure along a plurality of second trajectories (B), each of said second trajectories (B) being associated with one of said reference positions (C);
  wherein the method further includes obtaining, during displacement of the light beam along each of said second trajectories (B), a plurality of position signal outputs from said position sensitive detector (2).

18. Method according to claim 17, wherein said reference positions (C) are determined by analysing the amplitude of said at least one output signal from said position sensitive detector (2).

19. Method according to claim 18, wherein it is determined that a position is a reference position when said position corresponds to a local maximum in the amplitude of said at least one output signal from said position sensitive detector (2).

20. Method according to claim 18, wherein it is determined that a position is a reference position when said position corresponds to a local minimum in the amplitude of said at least one output signal from said position sensitive detector (2).

21. Method according to claim 18, wherein it is determined that a position is a reference position when said position corresponds to a local maximum of slope in the amplitude of said at least one output signal from said position sensitive detector (2).

22. Method according to claim 18, wherein it is determined that a position is a reference position when said position corresponds to a position having a specified relation to positions corresponding to local maxima and/or minima in the amplitude of said at least one output signal from said position sensitive detector (2).

23. Method according to claim 17, wherein the amplitude of said at least one output signal from said position sensitive detector (2) is indicative of the intensity of the light beam received by the position sensitive detector.

24. Method according claim 17, wherein the step of producing a relative displacement of said light beam with respect to the mechanical structure (5) is performed so that:
  the light beam is displaced along said first trajectory (A);
  upon detection of a reference position (C), displacement of the light beam along said first trajectory (A) is interrupted and instead the light beam is displaced along a second trajectory (B) corresponding to said reference position (C);

subsequently, displacement of the light beam along said first trajectory (A) is continued, until a subsequent reference position (C) is detected.

25. Method according to claim 17, wherein the step of producing a relative displacement of said light beam with respect to the mechanical structure (5) is performed so that:

the light beam is displaced along said first trajectory (A) until reaching an end of said first trajectory (A), while recording subsequent reference positions (C);

then, after reaching the end of said first trajectory (A), the light beam is subsequently displaced along the second trajectories (B) corresponding to the recorded reference positions (C).

26. Method according to claim 17, wherein said second trajectories (B) include a substantial number of points of each element or a region of each element in order to obtain a overall surface plot of the slope, displacement and/or vibration of said element or said region of said element.

27. Method according to claim 17, wherein the first trajectory (A) is a substantially straight trajectory in a first direction.

28. Method according to claim 17, wherein said second trajectories (B) are substantially straight trajectories in a direction substantially perpendicular to the first trajectory (A).

29. Method according to claim 17, wherein said second trajectories (B) are substantially straight trajectories in a direction substantially parallel to the first trajectory (A).

30. Method according to claim 17, wherein the first and/or the second trajectories are meandering and/or zigzag trajectories.

31. Method according to claim 17, wherein the mechanical structure (5) is a cantilever array and wherein the elements (51) are cantilevers of said cantilever array.

32. Method according to claim 17, further comprising the step of storing and/or treating said position signal outputs as data indicative of surface displacement and/or vibration characteristics of a corresponding element (51) of the mechanical structure (5), along the corresponding second trajectories (B).

33. Program comprising program instructions for causing an electronic programmable system to carry out the method according to claim 17, when the program is executed in said electronic programmable system.

34. Program according to claim 33, embodied on a record medium.

* * * * *